United States Patent

Clark et al.

[11] Patent Number: 6,116,043
[45] Date of Patent: Sep. 12, 2000

[54] FOOD PROCESSING APPARATUS

[75] Inventors: Robert A. Clark, Gardner; John C. Jasper, Clarendon Hills; Paul P. Schillinger, III, Palatine, all of Ill.

[73] Assignee: Delaware Capital Formation Inc., Wilmington, Del.

[21] Appl. No.: 09/188,087

[22] Filed: Nov. 9, 1998

Related U.S. Application Data

[63] Continuation-in-part of application No. 08/989,472, Dec. 12, 1997, abandoned.

[51] Int. Cl.[7] .................................................. F25D 17/02
[52] U.S. Cl. .................................................. 62/376; 62/64
[58] Field of Search ................................ 62/373, 376, 62, 62/64

[56] References Cited

U.S. PATENT DOCUMENTS

| | | |
|---|---|---|
| Re. 19,699 | 9/1935 | Velut . |
| 1,925,616 | 9/1933 | Velut . |
| 2,140,043 | 12/1938 | Zarotschenzeff . |
| 2,179,898 | 11/1939 | Pfeiffer . |
| 2,214,009 | 9/1940 | Boester ........................................ 62/376 |
| 2,286,225 | 6/1942 | Noyes . |
| 2,364,154 | 12/1944 | Markley, Jr. . |
| 2,920,462 | 1/1960 | Roser et al. . |
| 3,027,734 | 4/1962 | Mills ............................................ 62/376 |
| 4,261,181 | 4/1981 | Hofstetter . |
| 4,555,908 | 12/1985 | Peterson . |
| 4,768,351 | 9/1988 | Rubio . |
| 4,968,520 | 11/1990 | Wang . |
| 5,222,367 | 6/1993 | Yamada ........................................ 62/64 |
| 5,243,833 | 9/1993 | Coelho et al. .............................. 62/376 |
| 5,377,492 | 1/1995 | Robertson et al. . |
| 5,398,520 | 3/1995 | Kamin et al. . |
| 5,557,943 | 9/1996 | Coelho et al. .............................. 62/376 |
| 5,797,270 | 8/1998 | Halterman et al. ......................... 62/64 |

FOREIGN PATENT DOCUMENTS

| 697155 | 10/1940 | Germany ................................... 62/376 |
|---|---|---|

*Primary Examiner*—William Doerrler
*Attorney, Agent, or Firm*—John R. Hoffman

[57] ABSTRACT

An apparatus is provided for rapidly changing the temperature of food products or the like. The apparatus includes a tank having side walls and a bottom wall defining a reservoir for rethermalizing liquid. A nozzle introduces a substantial stream of rethermalizing liquid into the reservoir at a high velocity to cause a substantial turbulence substantially throughout the reservoir. The nozzle introduces the stream of rethermalizing liquid at a point remote from the side walls of the tank and, thereby, effect continuous movement of the liquid in the tank.

28 Claims, 6 Drawing Sheets

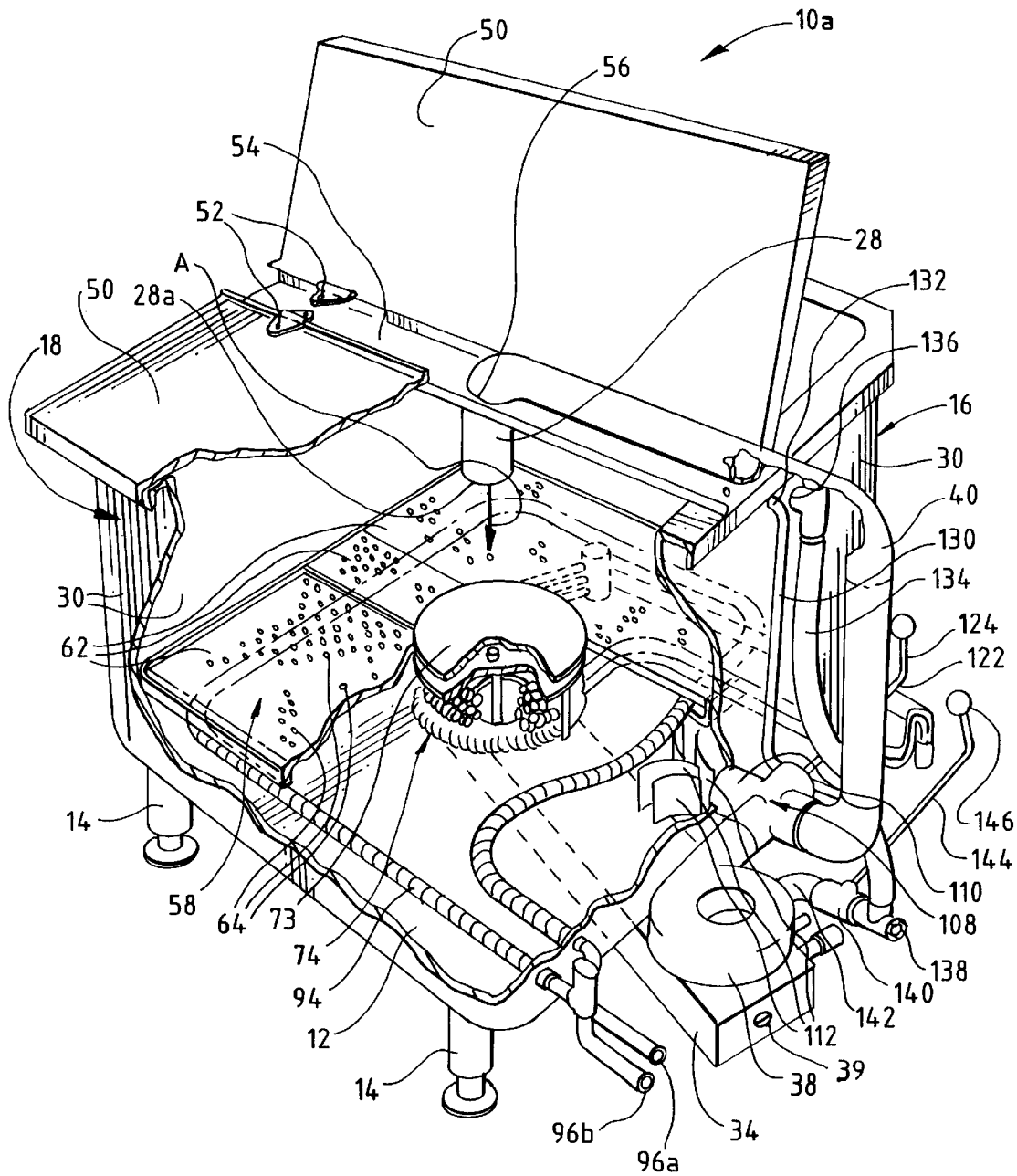

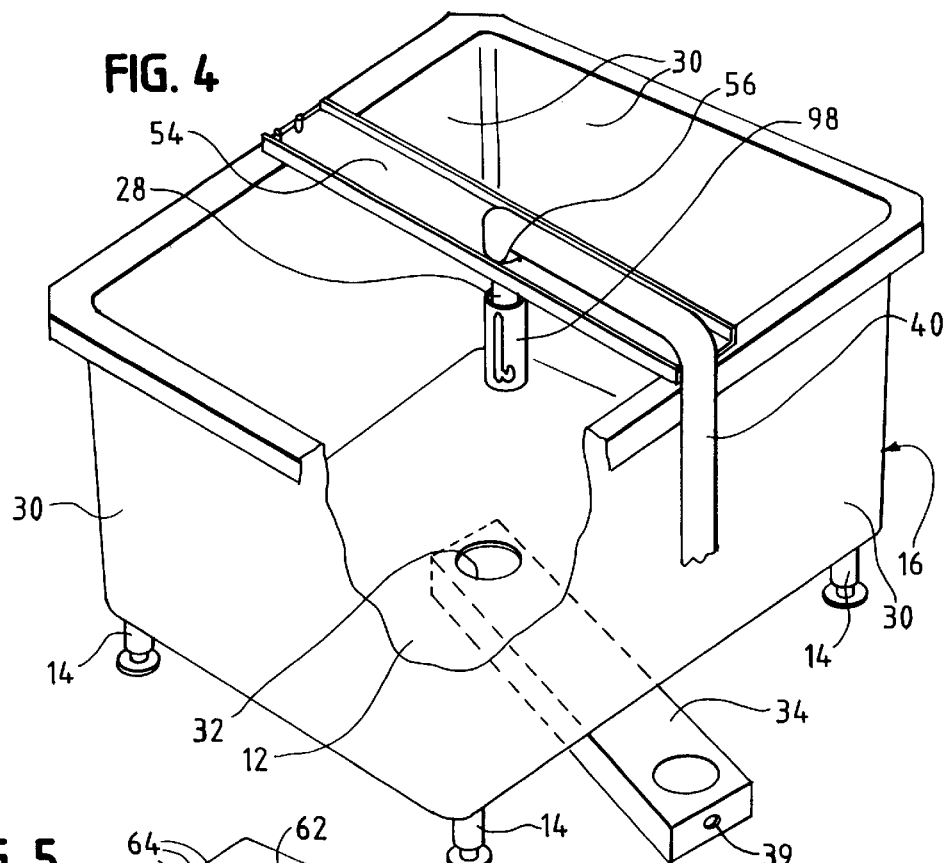
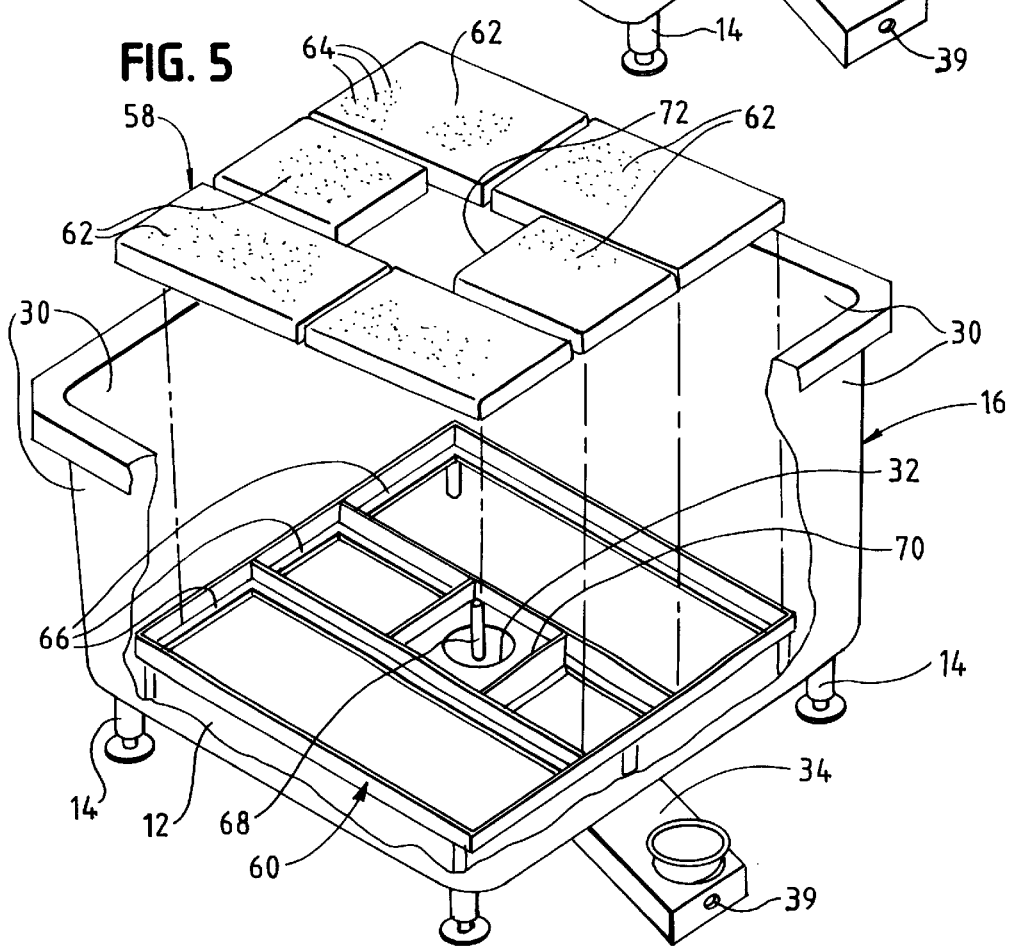

FOOD PROCESSING APPARATUS

CROSS-REFERENCE TO RELATED APPLICATION

This is a continuation-in-part of application Ser. No. 08/989,472 which was filed Dec. 12, 1997 now abandoned.

FIELD OF THE INVENTION

This invention generally relates to the art of food processing and, particularly, to an apparatus for rapidly changing the temperature of food products.

BACKGROUND OF THE INVENTION

It is known to process food products by a system which has been called a "cook-chill" method. Such methods are directed to solving the problem of matching food production to demand and separates the food production from food serving, by creating an inventory of prepared food products. The key to safe extended storage of foods is based on very rapidly chilling the food product through the rapid bacterial growth temperature danger zone, typically between 140°–45° F. The quality, taste, texture and aroma of the food then is retained by refrigerated storage.

Typical cook-chill methods involve first cooking the food in an appropriate apparatus, and then immediately placing the food in a chiller whereat the temperature of the food is rapidly reduced to approximately 38° F. Typically, the food is contained in plastic bags which hold individual servings or multiple-serving quantities.

Heretofore, the chiller typically has been of one or the other of two general types, namely a tumbler-type or a paddle-type. In the tumbler-type chiller, the bags of food are placed in a tank containing a chilling liquid, and the tank rotates about a non-horizontal axis to tumble the bags of food in the chilling liquid, sort of like an ordinary clothes dryer. In the paddle-type chiller, the bags of food are placed in a reservoir of chilling liquid in a tank, and paddles are used to move the liquid and food to facilitate rapid chilling of the food. Both the tumbler-type chillers and the paddle-type chillers cause problems with various types of food products, because these methods are somewhat "abusive" to the bagged food and can cause damage or break-up of food items contained in the bags. The bags may even become broken because of the abusive nature of agitating the chilling liquid. The present invention is directed to solving these problems by providing an apparatus for rapidly changing the temperature of food products by means which, in essence, do not involve any moving parts of the apparatus which could be abusive to the product.

It should be understood that, while the above background has been directed to cook-chill methods involving chilling apparatus (i.e. "chillers"), the invention is not limited to such apparatus and can be used for rapidly increasing the temperature of food products as well as reducing the temperature thereof (i.e. "rethermalizing" the food).

SUMMARY OF THE INVENTION

An object, therefore, of the invention is to provide a new and improved apparatus for rapidly changing the temperature of food products.

In the exemplary embodiment of the invention, the apparatus includes a tank having side wall means and bottom wall means defining a reservoir for chilling (or heating) liquid. Generally, nozzle means are provided for introducing a substantial stream of rethermalizing liquid into the reservoir at a high velocity to cause a substantial turbulence substantially throughout the reservoir. The nozzle is located to introduce the substantial stream of high velocity liquid at a point remote from the side wall means of the tank and, thereby, effect continuous movement of the liquid in the tank.

As disclosed herein, the nozzle means include a nozzle oriented for directing the stream of liquid downwardly into the reservoir of liquid. An outlet end of the nozzle extends downwardly into the tank to a point whereat the end of the nozzle can be located near a top surface of the liquid. The nozzle is shown herein as located generally centrally of the tank, but the nozzle can be off-center, if desired. Preferably, the side wall means include a plurality of planar side walls defining a polygonal tank, such as four side walls defining a square tank.

It is contemplated that the apparatus can be self-contained and include a recirculation system whereby a drain is provided in the bottom wall means of the tank. A pump and conduits are provided in communication between the drain and the nozzle for recirculating liquid through the apparatus. In one embodiment, chilling means, such as refrigeration coils, can be provided directly in the wall means of the tank.

In another embodiment, a perforated platform defines a floor in the tank spaced above the bottom wall thereof. Rethermalizing means are disposed between the perforated platform and the bottom wall of the tank. For instance, at least one cooling coil can be disposed below the platform. At least one heating tube also is disposed beneath the platform. The cooling coil comprises a coiled tube having spiral fins about the tube. The heating tube similarly has spiral fins thereabout.

It is contemplated that the pump means, conduit means and nozzle are of sufficient size and capacity to turn over the volume of liquid in the reservoir a plurality of times per minute. The pump means, conduit means and nozzle are of sufficient size and capacity to cause a turbulence in the reservoir sufficient to effect massaging of the food products.

Other features of the invention include a diffuser plate mounted in the reservoir in line with the liquid flow from the nozzle to multidirectionally diffuse the liquid from the nozzle into the reservoir. Valve means may be provided, operatively associated with the pump means and conduit means, to vary the rate of liquid introduced into the reservoir by the nozzle. The valve means is a diverter valve in the conduit means along with a second inlet into the tank. An extension member may be mountable at a discharge end of the nozzle to vary the location of the discharge end, i.e. in relation to the level or surface of the liquid in the reservoir.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a perspective view of a second embodiment of an apparatus incorporating the concepts of the invention, with portions of the side walls, lid, floor and other components of the apparatus broken away to facilitate the illustration;

FIG. 4 is a view similar to that of FIG. 3, with various components removed to illustrate the bottom wall and drain of the tank;

FIG. 5 is a view similar to that of FIG. 3, with various of the components removed to illustrate the structure of the perforated platform in the bottom of the tank;

DETAILED DESCRIPTION OF THE PREFERRED EMBODIMENTS

Figure 1:
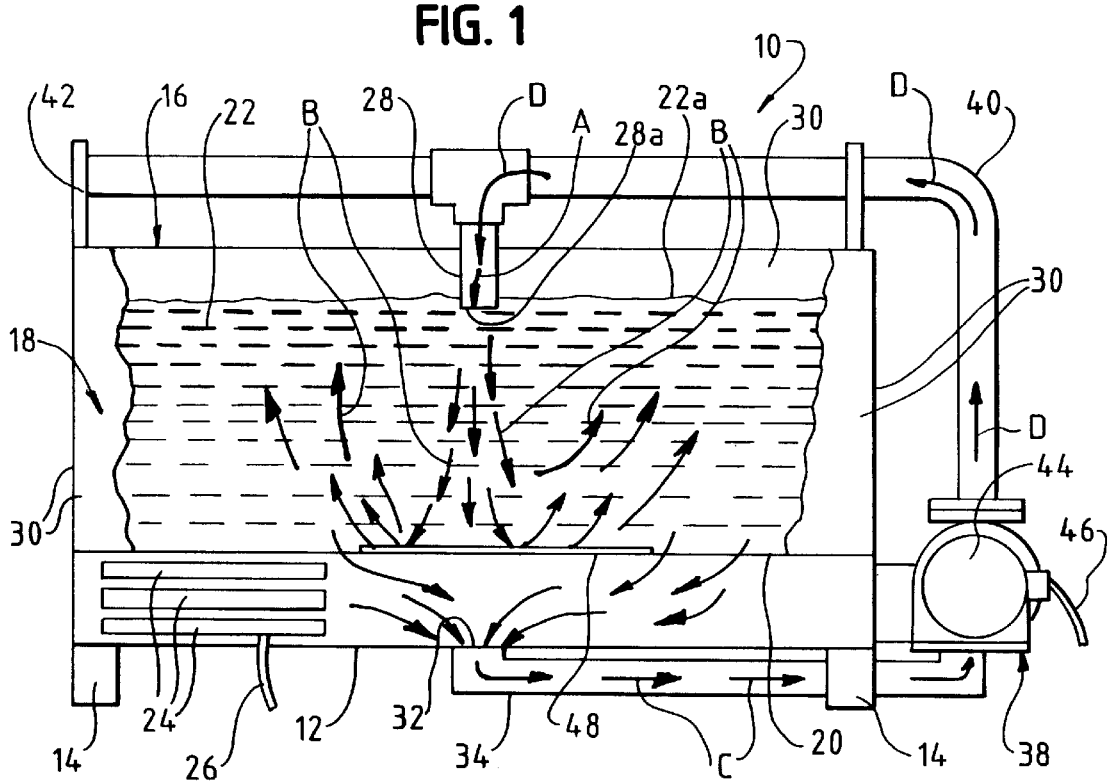
FIG. 1 is a somewhat schematic side elevational view of one embodiment of an apparatus incorporating the concepts of the invention, with a portion of the side wall of the tank broken away to facilitate the illustration.
Figure 2:
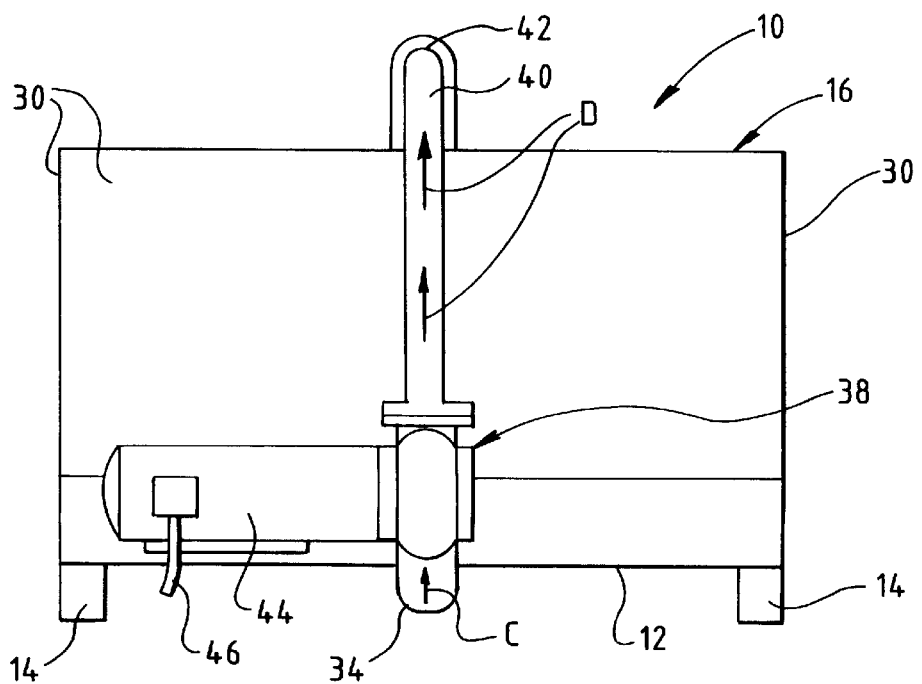
FIG. 2 is a somewhat schematic side elevational view of the apparatus, looking toward the right-hand side of FIG. 1.
Figure 6:
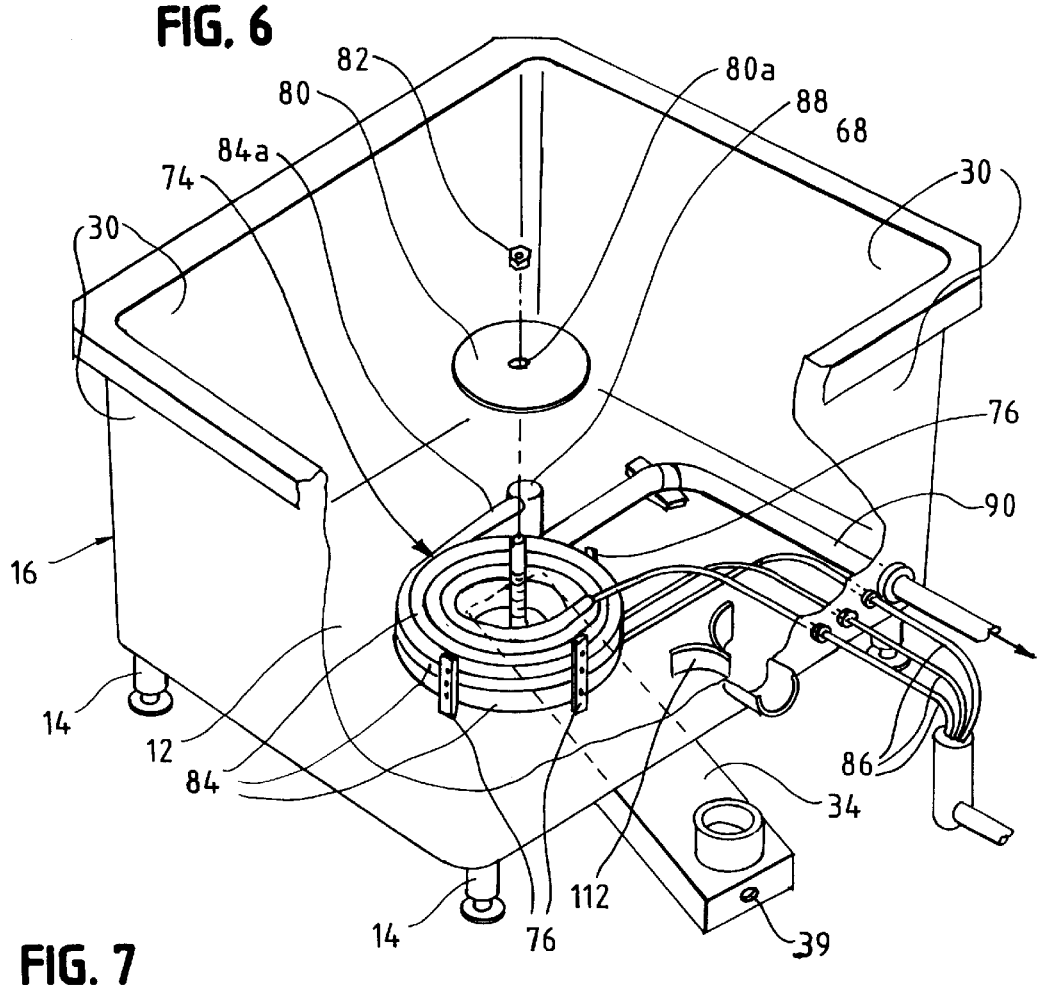
FIG. 6 is a view similar to that of FIG. 3, with various components removed to illustrate the location of the cooling coils.

Referring to the drawings in greater detail, FIGS. 1 and 2 show a first embodiment of the invention incorporated in an apparatus, generally designated 10, for rapidly changing the temperature of food products or the like. The apparatus includes a base 12 having depending legs 14 for supporting the apparatus on an appropriate support structure, such as a floor. A tank, generally designated 16, is supported by base 12. The tank has side wall means, generally designated 18, and a diffuser wall 20 combining to define a reservoir of liquid 22. Coils 24 (FIG. 1) are shown mounted between diffuser wall 20 and base 12 and are connected, as at 26, to an appropriate power source. Diffuser wall 20 is perforated and base 12 comprises a solid wall. The coils may be refrigeration coils so that apparatus 10 operates as a chilling apparatus ("chiller") or the coils can be heating coils so that apparatus 10 is a heater.

Generally, nozzle means are provided for introducing a substantial stream of liquid into the reservoir at a point remote from the side wall means of the tank and, thereby, effecting continuous movement of liquid 22 in tank 16. More particularly, FIG. 1 shows the nozzle means as a downwardly extending nozzle 28 having an opening 28a so that the stream of liquid is directed downwardly into the reservoir of liquid, as indicated by arrow "A". The open end 28a of the nozzle is shown located near a top surface 22a of liquid 22. The open end can be located slightly below the surface of the liquid or slightly above the surface of the liquid but, preferably, the outlet or open end of the nozzle should be located near the top surface of the liquid. Tank 16 is shown herein as a polygonal tank, particularly a square tank, whereby side wall means 18 include four side walls 30. Nozzle 28 is shown located generally centrally of the tank, i.e. equidistant from the four side walls thereof. With this arrangement, the downwardly forced stream of liquid "A" enters the reservoir of liquid 22 and creates a sort of vortex, causing the liquid to continuously move rapidly in the direction of arrows "B". With bags of food placed in the reservoir of liquid, the food product will move with the moving liquid to effect a rapid change in the temperature of the food toward the temperature of the liquid. It can be seen that there are no moving parts of the apparatus, as is common with tumbler-type or paddle-type apparatus, which can abuse the food products.

The invention contemplates that apparatus 10 be a self-contained unit. To that end, not only are coils 24 in thermal transfer relationship with the reservoir of liquid, but a drain 32 is provided in base wall 12 of tank 16 leading to a lower conduit 34 as best seen in FIG. 1. Diffuser wall 20 is located at the bottom of the tank spaced above the drain. Conduit 34 directs liquid in the direction of arrows "C" to a pump, generally designated 38. The pump can be a centrifugal-type pump which recirculates the liquid through an upper conduit 40, as indicated by arrows "D" to nozzle 28. The conduit can extend beyond the nozzle and be fixed to a support 42 at the side of the tank opposite the pump. The pump includes an electrical motor 44 (FIG. 2) connected, as at 46, to an appropriate power source.

A solid "bounce" plate 48 is located immediately below nozzle 28 centrally of diffuser wall 20. This solid plate acts to redirect the downward flow of liquid back upwardly as shown by arrows "B". The plate also protects the food products from the strong suction action at drain 32 which is below the bounce plate. The drain actually is the intake to the pump. The perforated diffuser wall 20 has a dual purpose, namely: to reduce or diffuse the strong suction action of the pump intake and to act as a filter to protect the pump from foreign debris, from food from broken casings and from the food casings themselves.

FIGS. 3–13 show a second embodiment of the invention as incorporated in an apparatus, generally designated 10A, again for rapidly changing the temperature of food products or the like. In FIGS. 3–13, like numerals have been applied to designate like components of apparatus 10A corresponding to those components described above in relation to apparatus 10 in FIGS. 1 and 2. Specifically, apparatus 10A includes a tank, generally designated 16, supported by legs 14. The tank is rectangular (square) as defined by side wall means 18 including four side walls 30. The tank has a bottom wall 12. A pair of lids 50 are pivotally mounted by a plurality of hinges 52 to a support channel 54 which spans the top of the tank. Nozzle 28 projects downwardly through a hole 56 in support channel 54 generally at a mid-point thereof. The nozzle has an opening 28a so that the stream of rethermalizing liquid is directed downwardly into the reservoir of liquid, as indicated by arrow "A". A pump 38 delivers the liquid through an upper conduit 40 to nozzle 28.

Referring to FIG. 4 in conjunction with FIG. 3, a drain 32 in bottom wall 12 of tank 16 leads through a lower conduit 34 to pump 38. Therefore, like apparatus 10, apparatus 10A is a self-contained unit whereby liquid is recirculated from the tank through drain 32 and lower conduit 34, through pump 38 and back to the tank through upper conduit 40 and nozzle 28. A dump drain 39 can be provided in lower conduit 34 to completely drain the tank.

Referring to FIG. 5 in conjunction with FIG. 3, a diffuser wall in the form of a perforated platform, generally designated 58, is mounted on a framework, generally designated 60, spaced above bottom wall 12 of tank 16. The perforated platform defines an elevated floor above the bottom wall of the tank. The perforated platform includes a plurality of rectangular sections 62 which are perforated by a plurality of holes 64. The rectangularly shaped platform sections 62 seat within correspondingly rectangular shaped recesses of framework 60, as defined by ledges 66 of the framework. FIG. 5 also shows a mounting post 68 fixed to a bottom wall of the lower conduit 34 (see FIG. 7) and projecting upwardly through the center of a rectangular opening 70 in platform 60 and centrally of a rectangular (square) opening 72 in perforated platform 58.

A solid bounce plate or disk 73 (FIG. 3) rests on top of perforated platform 58 and may be interlocked with framework 60 directly in line with nozzle 28 to cause a turbulent reverse rolling action as described above in relation to FIG. 1. The diffuser plate is sufficiently large to cover opening 72 (FIG. 5) in perforated platform 58 to prevent any food products from being sucked downwardly into the bottom of the tank.

Figure 7:
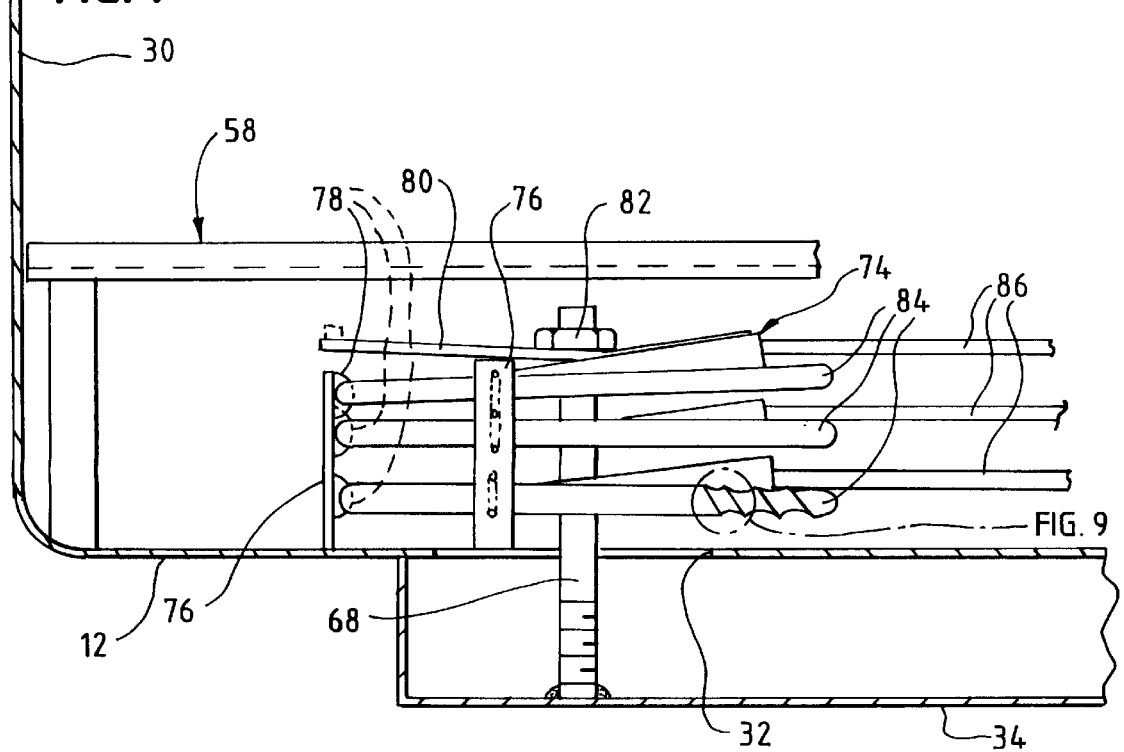
FIG. 7 is a fragmented view showing an elevational depiction of the cooling coils.
Figure 8:
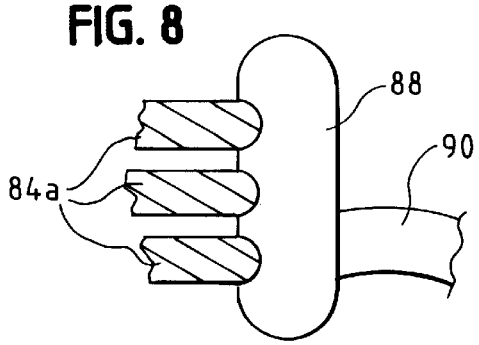
FIG. 8 is a fragmented section of detail "A" in FIG. 6.

Referring to FIGS. 6–9 in conjunction with FIG. 3, a cooling coil assembly, generally designated 74, is mounted on bottom wall 12 of tank 16 surrounding mounting post 68. The cooling coil assembly is mounted by a plurality of peripheral, upstanding brackets 76 and U-bolts 78 (FIG. 7). The cooling coil assembly is held down by a top disk 80 having a center hole 80a through which mounting post 68 extends. A nut 82 is threaded onto the mounting post to hold the mounting disk on top of cooling coil assembly 74.

Cooling coil assembly 74 comprises three spiral cooling coils 84 which are concentric and vertically stacked. Each cooling coil includes its own inlet 86 for receiving a cooling medium from a source thereof. Each cooling coil 84 has an outlet end 84a (FIG. 8) in communication with a manifold 88 that communicates with a single outlet tube 90.

Figure 9:
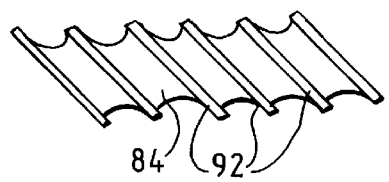
FIG. 9 is an elevational view of a fragmented section of one of the cooling coils.

FIG. 9 shows a circumferential section of one of the cooling coils 84. Each cooling coil is hollow or tubular and fabricated of good heat conductive material, such as, but not limited to, copper. Each coil is formed with an integral, outwardly projecting spiral rib 92 which is effective to form circumferential ribs seriatim along the circumference of the cooling coil. These ribs enhance the heat exchange capability of the cooling coils.

Figure 10:
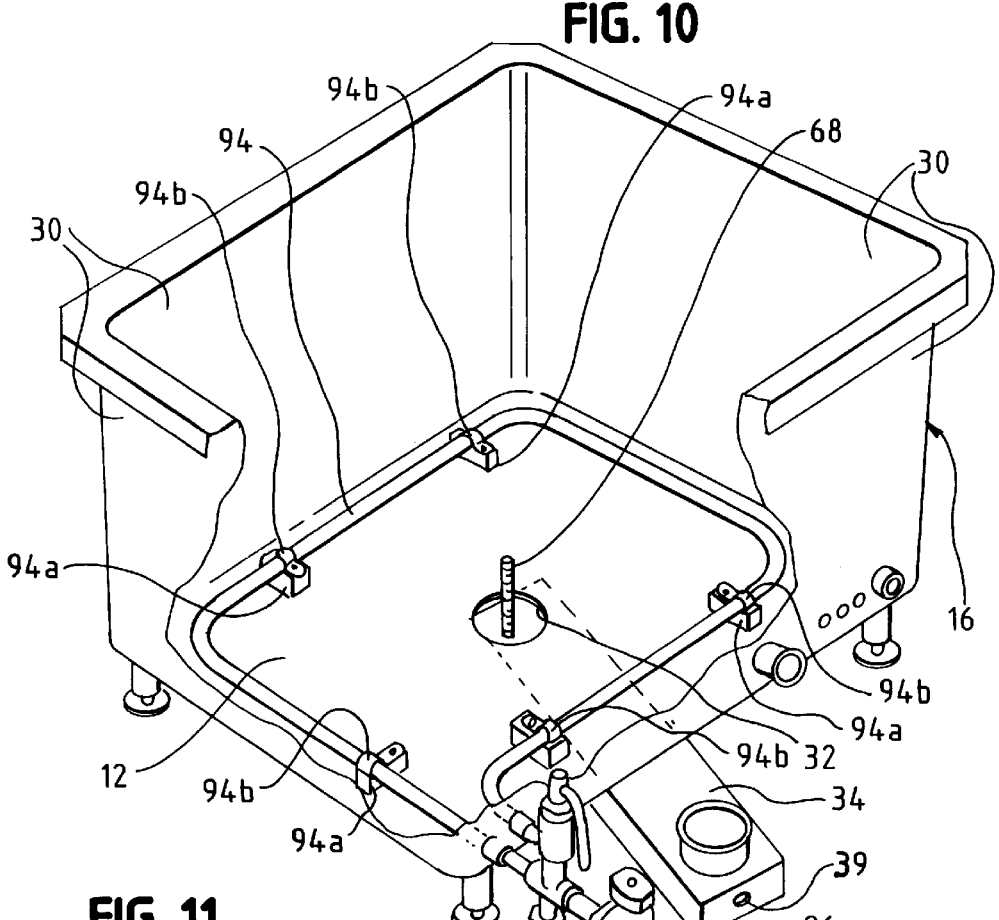
FIG. 10 is a view similar to that of FIG. 3, with various components removed to illustrate the location and details of the heating tube.

Referring to FIG. 10 in conjunction with FIG. 3, a heating tube 94 is mounted to bottom wall 12 of tank 16 by means of a plurality of mounting blocks 94a and brackets 94b. As can be seen clearly in FIG. 10, the heating tube can be generally rectangular in configuration and circumscribed the bottom wall of the polygonal tank spaced somewhat inwardly from side walls 30 thereof. Therefore, the heating tube is mounted above the bottom wall of the tank but below perforated platform 58. FIG. 10 shows a valve and piping arrangement, generally designated 96, for circulating a heating medium, such as steam, through heating tube 94. Suffice it to say, the arrangement has an inlet 96a for feeding steam or the like to the heating tube, and an outlet 96b from which the steam leaves the heating tube. It is contemplated that the heating tube can be another form of heating element, such as an electrical heating element.

Figure 11:
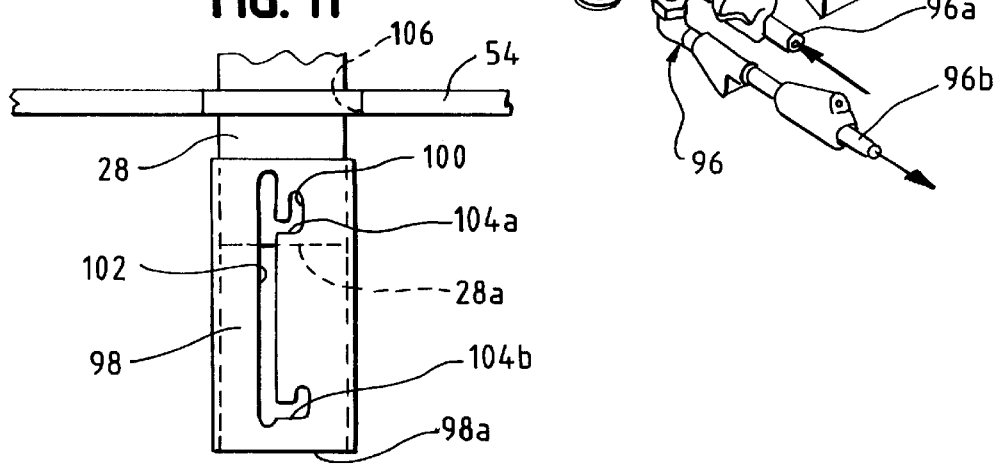
FIG. 11 is an elevational view of the discharge end of the nozzle, along with a nozzle extension.

Referring to FIG. 11, an extension member 98 is shown mounted on nozzle 28 over discharge end 28a, to allow for varying the location of the discharge end. Extension member 98 is tubular and telescoped over nozzle 28. The nozzle has a pin 100 projecting therefrom for receipt in a slot 102 in the extension member. Slot 102 has a pair of L-shaped branches positioning 104a and 104b for receiving pins 100 at two different vertical positions of the extension member relative to the nozzle. When pin 100 is located in positioning branches 104 of slot 102, the extension member projects significantly downwardly from discharge end 28 of the nozzle to form a lower discharge end 98a. If the nozzle is elevated through an opening 106 in support channel 54 so that pin 100 seats into positioning branches 104b, the discharge end 98a substantially coincides with discharge end 28a of the nozzle. Of course, additional positioning branches can be added and/or the tubular extension member can be lengthened to provide further variants in the discharge end of the nozzle to compensate for different levels of water in tank 16.

Figure 12:
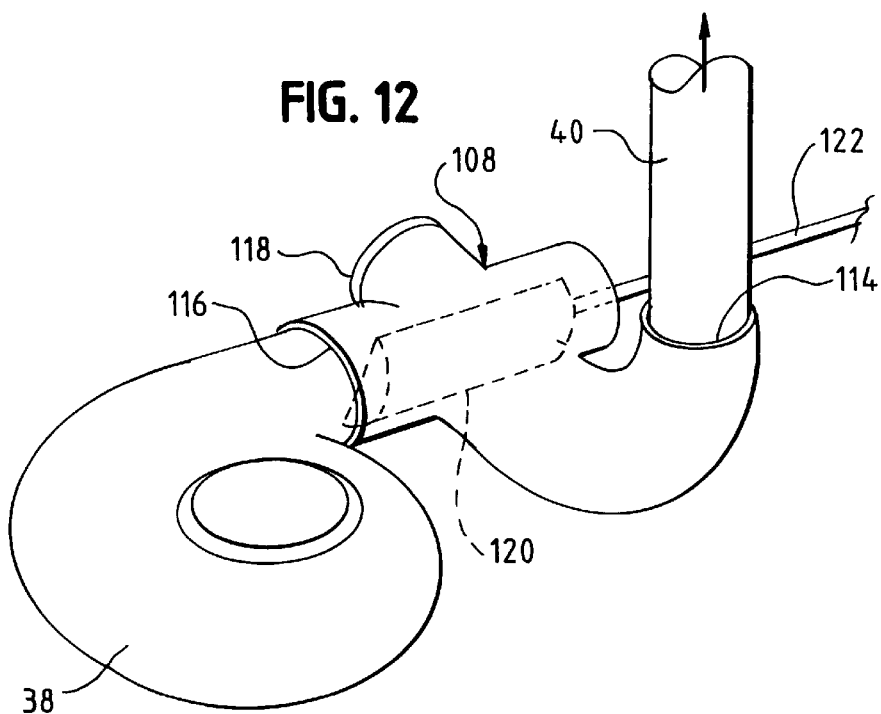
FIG. 12 is an enlarged perspective view of the diverter valve and its location relative to the pump and the upper conduit.
Figure 13:
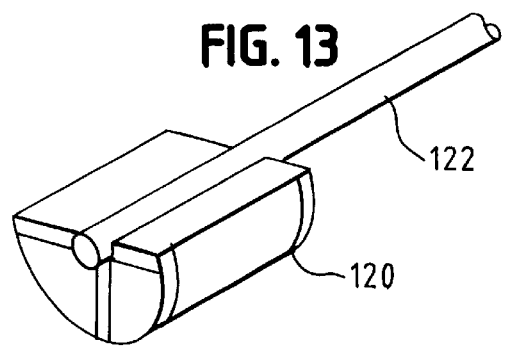
FIG. 13 is a perspective view of the rotatable valve member of the diverter valve.
Figure 14:
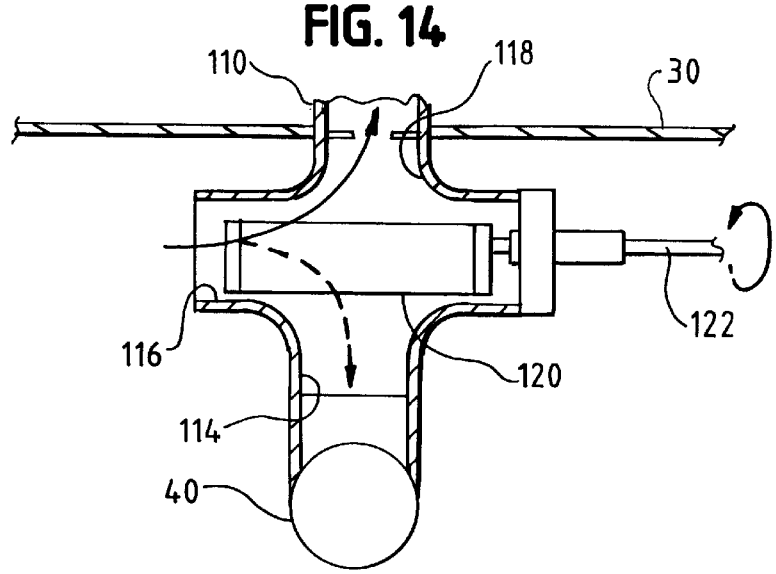
FIG. 14 is a horizontal section through the diverter valve.

Referring to FIGS. 12–14 in conjunction with FIG. 3, a diverter valve, generally designated 108, is located at an intersection between pump 38, upper conduit 40 leading to nozzle 28, and a second or auxiliary inlet 110 (FIG. 3) extending through the adjacent side wall 30 and into tank 16. A plurality of baffles 112 are mounted within the tank to distribute water omnidirectionally into the tank from second inlet 110. As seen in FIG. 12, diverter valve 108 has an opening 114 communicating with upper conduit 40, an opening 116 communicating with pump 38 and an opening 118 communicating with second inlet 110. A valve member 120 (also see FIG. 13) is connected by an operating rod 122 to a handle 124 for rotating valve member 120 within diverter valve 108. The purpose of the diverter valve is to allow for a varying amount of liquid from pump 38 to be diverted away from upper conduit 40 and nozzle 28 to second inlet 110 and baffles 112. This can change the flow pattern of liquid in the tank and can vary the amount of turbulence in the tank caused by liquid discharged downwardly by nozzle 28.

Referring to FIG. 3, a fill tube 130 leads from an appropriate source thereof to the top of one of the side walls 30, as at 132, to add liquid, such as water, to tank 16. Of course, appropriate level sensors can be used to control an appropriate valve operatively associated with fill tube 130 to maintain a constant level of liquid in the tank. An overflow tube 134 also communicates with the tank, as at 136, to allow excess liquid to drain from the tank and out of a bottom drain or sump 138. A drain valve 140 also can be used in a drain pipe 142 leading from lower conduit 34 to sump 138 to completely drain the tank when desired. A rotatable valve rod 144 extends from drain valve 140 to an operating handle 146.

The chilling (or heating, i.e. rethermalizing) of food contained in flexible casings or packages is greatly enhanced or speeded-up by tumbling or randomly distorting (massaging) the package shape. This causes the interior hot product to be physically moved close to the exterior of the casing whereat it is cooled (or heated). This physical movement results in faster cooling than can be obtained by conduction only (i.e. static cooling). The present invention further enhances this action by its strong water circulation pattern. It is not necessary to mechanically tumble the food products as in prior art devices described in the "Background", above, which may prove to be detrimental to the package or to the product integrity in which case the water circulation rate must be reduced to an appropriate level.

It has been found in actual practice that substantial turbulence can be created substantially throughout the entire reservoir of liquid in tank 16. As but one example, introducing the liquid through a nozzle 28 having a four-inch diameter discharge end 28a, at the rate of 700 gallons per minute causes substantial turbulence throughout the entire tank. This was done with a tank containing approximately 200 gallons of liquid. This also was performed with a ratio of two parts of rethermalizing liquid (water) to one part of packaged food product. Of course, if this substantial turbulence is not desired for a very gentle product, the water jet flow rate can be reduced by operating diverter valve 108. The heating medium within heating tube 94 typically is steam. The cooling medium within cooling coils 84 can be a refrigerant or a super cooled liquid media such as brine or glycol solutions.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An apparatus for rapidly changing the temperature of food products and the like, comprising:
    a tank having side walls and a bottom wall defining a reservoir for rethermalizing liquid, and a drain;
    a nozzle for introducing a substantial stream of rethermalizing liquid into the reservoir at a high velocity to cause a substantial turbulence substantially throughout the reservoir, the nozzle being located to introduce the substantial stream of high velocity liquid at a point closer to a center of the tank than the side walls of the tank; and
    pump means and conduit means in communication between the drain and the nozzle for recirculating the liquid through the apparatus.

2. An apparatus for rapidly changing the temperature of food products and the like, comprising:
    a tank having side walls and a bottom wall defining a reservoir for rethermalizing liquid, and a drain;
    a nozzle for introducing a substantial stream of rethermalizing liquid into the reservoir at a high velocity to cause a substantial turbulence substantially throughout the reservoir, the nozzle being located to introduce the substantial stream of high velocity liquid at a point remote from the side walls of the tank;
    pump means and conduit means in communication between the drain and the nozzle for recirculating the liquid through the apparatus; and
    said pump means, conduit means and nozzle being of sufficient size and capacity to turn over the volume of liquid in the reservoir a plurality of times per minute.

3. The chilling apparatus of claim 1 wherein said pump means, conduit means and nozzle are of sufficient size and capacity to cause a turbulence in the reservoir sufficient to effect massaging of the food products.

4. The apparatus of claim 1 wherein said nozzle is oriented for directing the stream of rethermalizing liquid downwardly into the reservoir of liquid.

5. The apparatus of claim 4 wherein an outlet end of the nozzle extends downwardly into the tank to a point whereat the outlet end can be located near a top surface of the rethermalizing liquid.

6. The apparatus of claim 1 wherein said nozzle is located generally centrally of the tank.

7. The apparatus of claim 1, including a plurality of said side walls defining a polygonal tank.

8. The apparatus of claim 7, including four of said side walls defining a square tank.

9. The apparatus of claim 1, including at least one cooling coil disposed within said reservoir.

10. The apparatus of claim 9, including a perforated platform in the tank spaced above the bottom wall thereof, said cooling coil being located beneath the platform.

11. The apparatus of claim 9, wherein said cooling coil comprises a coiled tube having spiral fins about the tube.

12. The apparatus of claim 1, including at least one heating element disposed within said reservoir.

13. The apparatus of claim 12, including a perforated platform in the tank spaced above the bottom wall thereof, said heating element being located beneath the platform.

14. The apparatus of claim 12 wherein said heating element comprises a tube having spiral fins thereabout.

15. An apparatus for rapidly changing the temperature of food products and the like, comprising:
    a tank having side walls and a bottom wall defining a reservoir for rethermalizing liquid, and a drain;
    a nozzle for introducing a substantial stream of rethermalizing liquid into the reservoir at a high velocity to cause a substantial turbulence substantially throughout the reservoir, the nozzle being located to introduce the substantial stream of high velocity liquid at a point remote from the side walls of the tank;
    pump means and conduit means in communication between the drain and the nozzle for recirculating the liquid through the apparatus; and
    a bounce plate mounted in the reservoir in line with the liquid flow from the nozzle to multidirectionally diffuse the liquid from the nozzle in the reservoir.

16. An apparatus for rapidly changing the temperature of food products and the like, comprising:
    a tank having side walls and a bottom wall defining a reservoir for rethermalizing liquid, and a drain;
    a nozzle for introducing a substantial stream of rethermalizing liquid into the reservoir at a high velocity to cause a substantial turbulence substantially throughout the reservoir, the nozzle being located to introduce the substantial stream of high velocity liquid at a point remote from the side walls of the tank;
    pump means and conduit means in communication between the drain and the nozzle for recirculating the liquid through the apparatus; and
    valve means operatively associated with said pump means and conduit means to vary the rate of liquid introduced into the reservoir by said nozzle.

17. The apparatus of claim 16 wherein said valve means comprises a diverter valve in said conduit means coupled to an auxiliary inlet into the tank spaced from said nozzle.

18. An apparatus for rapidly changing the temperature of food products and the like, comprising:
    a tank having side walls and a bottom wall defining a reservoir for rethermalizing liquid, and a drain;
    a nozzle for introducing a substantial stream of rethermalizing liquid into the reservoir at a high velocity to cause a substantial turbulence substantially throughout the reservoir, the nozzle being located to introduce the substantial stream of high velocity liquid at a point remote from the side walls of the tank;
    pump means and conduit means in communication between the drain and the nozzle for recirculating the liquid through the apparatus; and
    an extension member mountable at a discharge end of the nozzle to vary the location of the discharge end.

19. An apparatus for rapidly changing the temperature of food products and the like, comprising:
    a tank having side walls and a bottom wall defining a reservoir for rethermalizing liquid, and a drain;
    a nozzle for introducing a stream of rethermalizing liquid into the reservoir at a point closer to a center of the tank than the side walls of the tank;

pump means and conduit means in communication between the drain and the nozzle for recirculating the liquid through the apparatus;

a perforated platform in the tank spaced above the bottom wall thereof; and a liquid thermalizing unit mounted in the tank between the perforated platform and the bottom wall of the tank.

20. The apparatus of claim 19 wherein said nozzle is oriented for directing the stream of rethermalizing liquid downwardly into the reservoir of liquid.

21. The apparatus of claim 19, including a plurality of said side walls defining a polygonal tank.

22. The apparatus of claim 19 wherein said liquid thermalizing unit comprises at least one cooling coil.

23. The apparatus of claim 19 wherein said liquid thermalizing unit comprises a heating element.

24. An apparatus for rapidly changing the temperature of food products and the like, comprising:

a tank having side walls and a bottom wall defining a reservoir for rethermalizing liquid, and a drain;

a nozzle for introducing a stream of rethermalizing liquid into the reservoir at a point remote from the side walls of the tank;

pump means and conduit means in communication between the drain and the nozzle for recirculating the liquid through the apparatus;

a perforated platform in the tank spaced above the bottom wall thereof;

a liquid thermalizing unit mounted in the tank between the perforated platform and the bottom wall of the tank; and a bounce plate mounted in the reservoir in line with the liquid flow from the nozzle to multidirectionally diffuse the liquid from the nozzle in the reservoir.

25. An apparatus for rapidly changing the temperature of food products and the like, comprising:

a tank defining a reservoir for rethermalizing liquid;

at least one spiral rethermalizing coil in the reservoir, the coil comprising a coiled tube having spiral fins about the tube; and means for moving the liquid in the reservoir over the rethermalizing coil.

26. The apparatus of claim 25, including a plurality of said coils in a concentric stacked arrangement.

27. An apparatus for rapidly changing the temperature of food products and the like, comprising:

a tank having side walls, a bottom wall defining a reservoir for rethermalizing liquid, and a drain;

a nozzle for introducing a stream of rethermalizing liquid into the reservoir at a point remote from the side walls thereof;

pump means and conduit means in communication between the drain and the nozzle for recirculating the liquid through the apparatus;

an auxiliary inlet through a side wall of the tank in communication with said pump means and conduit means; and a diverter valve operatively associated between the auxiliary inlet and the conduit means to divert liquid from the nozzle to the auxiliary inlet.

28. The apparatus of claim 27, including baffle means in the tank in line with said auxiliary inlet to omnidirectionally distribute the liquid from the inlet into the tank.

* * * * *